Sept. 10, 1963
S. A. MINERA
3,103,240
FRUIT STEMMER
Filed Jan. 25, 1962
2 Sheets-Sheet 1
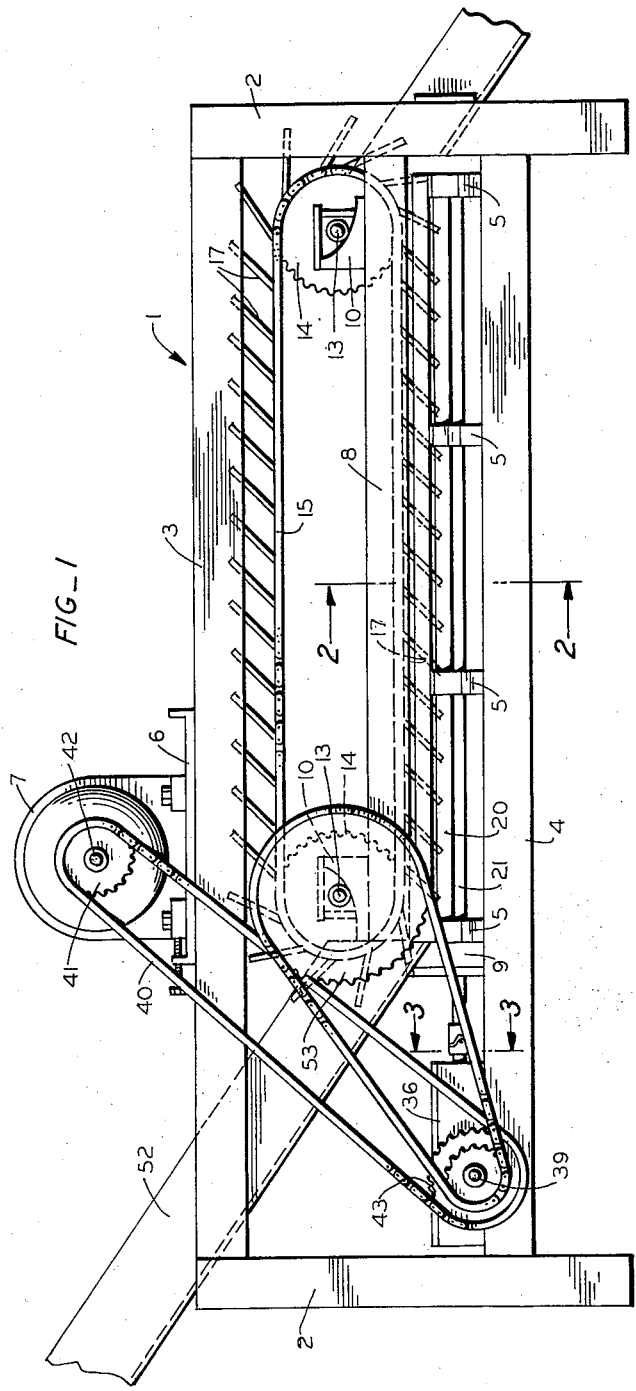
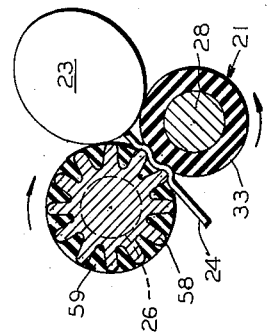
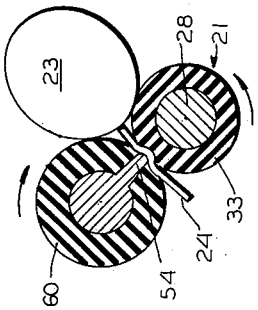
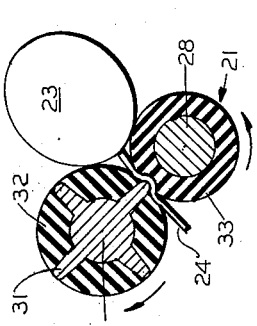
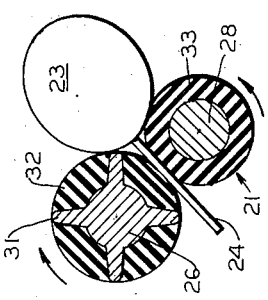
INVENTOR.
SALVADOR A. MINERA
BY
Boyken, Mohler & Wood
ATTORNEYS

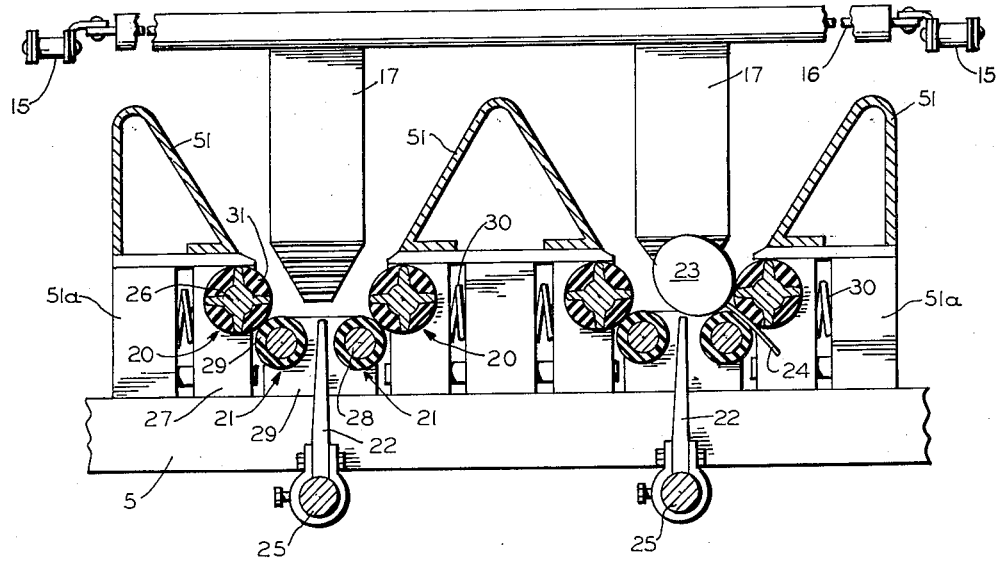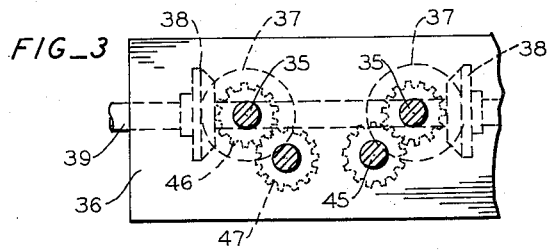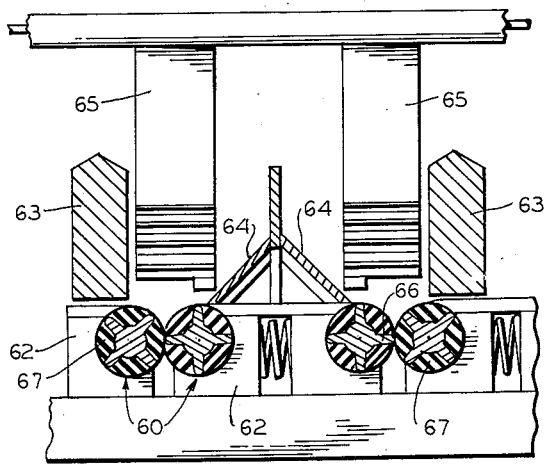

United States Patent Office 3,103,240
Patented Sept. 10, 1963

3,103,240
FRUIT STEMMER
Salvador A. Minera, 1500 Judah St.,
San Francisco, Calif.
Filed Jan. 25, 1962, Ser. No. 168,681
9 Claims. (Cl. 146—55)

This invention relates to a machine for stemming fruit, and has for one of its objects the provision of a machine that is adapted to remove the stems from such fruit as cherries, olives, grapes and the like, without injury to the fruit, in those instances where the stems are connected to the fruit at different degrees of tenacity, from low to high, and which machine is more economical to make and to maintain than heretofore.

Another object of the invention is the provision of a fruit stemmer that is adapted to operate continuously at maximum efficiency for stemming fruit that heretofore has been difficult, and many times impossible to stem without substantially impairing the efficiency of the stemmer.

In most respects, the fruit stemming machine hereinafter described is quite similar to the machine disclosed in my copending application Serial No. 28,307, filed May 11, 1960. In that disclosure two horizontally spaced pairs of horizontally extending parallel stemming rollers are shown in side by side relation, said pairs being disposed in planes extending divergently upwardly from a vertical plane bisecting the space between the two pairs of rollers. Thus the two pairs of rollers provided opposite sides of a generally V-shaped channel for the fruit to move longitudinally thereof for engagement of the stems of the fruit between the rollers of one pair or the other as the fruit was moved longitudinally of the rollers.

In the present instance the same structure may be used, except for the structure of the rollers. Or a stemmer of the type shown in my copending application, Serial No. 17,280 filed March 24, 1960, now U.S. Patent Number 3,036,613 may be used, except for the structure of the stemming rollers. In this application the rollers are in a horizontal plane and each pair supports the fruit thereon for movement of the fruit from one of the ends of the rollers of a pair thereof to the other end.

The basic principle in both of the above applications and in the present application is the same, namely: the stems are drawn between a pair of rollers until the fruit bodies contact the rollers, and then continued rotation of the rollers pulls the stems from the bodies.

Heretofore, however, it has not been possible to satisfactorily remove all of the stem from fruit, such as cherries, and sometimes olives. In certain localities, and with certain cherries, the stems adhere to the pits with such a high degree of tenacity that the rollers cannot grip them with sufficient force to pull them from the pits. Even where provision is made, as in said application Serial No. 28,307, to provide a greater gripping contact with the stems, there are stems that will not separate from the pits. As for other fruit, such as grapes, there is no difficulty.

Where stemming rollers, and combinations of rollers and belts are used, as in said applications, and the stems will not separate from the fruit, the rollers will slip on the stems, holding the fruit against the rollers. This not only injures the fruit, due to the rollers rotating against them, but the fruit that is so held will block other fruit from movement from one of the ends of the rollers to the other. This will cause fruit to pile up against the held fruit and some fruit will then be dragged over the pile and will not be stemmed. The optimum of efficiency requires substantially instantaneous withdrawal of the stems from the fruit bodies as soon as the stems are caught between the rollers.

In the case of olives, oil is released from broken and over-ripe olives, and from their stem ends. This oil makes the rollers slippery, thereby materially reducing their gripping efficiency.

From the foregoing, it is apparent that the problem with respect to some olives and cherries, is to be able to grip the stems with sufficient pressure to pull the stems from the fruit without injury to the fruit and without breaking the stems.

By the roller structure in the present invention the above problem is solved, and the most tenaciously held stems are quickly removed from the fruit without injury to the fruit or breaking the stems.

Other objects and advantages will appear in the drawings and in the description.

In the drawings, FIG. 1 is a side elevational view of a stemming machine that incorporates the present invention.

FIG. 2 is an enlarged cross sectional view at line 2—2 of FIG. 1.

FIG. 3 is an enlarged, fragmentary cross sectional view taken along line 3—3 of FIG. 1.

FIG. 4 is an enlarged, cross sectional view taken through a pair of rollers illustrating one relationship between the stem of a cherry and the rollers in a stemming operation.

FIG. 5 is an enlarged cross sectional view similar to that of FIG. 4 showing another relationship between the stem and the rollers.

FIGS. 6, 7 and 8 are different modifications of the structure of FIG. 5.

In detail, a machine comprises a frame, generally designated 1 (FIG. 1), which machine may have legs 2, upper and lower side frame members 3, 4 and cross frame members 5 (FIG. 2) extending between the lower cross frame members. An upper cross frame member 6 (FIG. 1) supports a motor 7 thereon, and spaced between the upper and lower side frame members are frame members 8, extending longitudinally of side frame members 3, 4, but shorter than the latter. These frame members 8 may extend from the discharge end of the machine, which is the right hand end as seen in FIG. 1, to supports 9 that are on the frame 1 adjacent to but spaced from the feed end of the machine, which is the left hand end as seen in FIG. 1.

The side frame members 8 carry bearings 10 at their opposite ends (FIG. 1). Said bearings 10 support shafts 13, each of which has a pair of sprocket wheels 14 secured thereto at their opposite ends.

Sprocket chains 15 extend around and connect the sprocket wheels 14 that are at opposite ends of shafts 13, and links on said chains support bars 16 (FIG. 2) that extend between the chains. These bars 16, in turn, have flat sided, resilient, flexible members 17 of rubber or composition material secured thereto. These members are inclined (FIG. 1) in a direction rearwardly and downwardly from their upper ends so that their upper ends are leading in the direction of movement of the lower flights of chains 15. Said members preferably have sufficient rigidity to be self sustaining in their inclined positions, and their function is to move the fruit bodies in the direction of movement of the upper flights of the chains 15, and to roll the bodies as the latter are moved and to yieldably hold the bodies down, as will later appear. The structure of these members 17 is similar to that shown in greater detail in my U.S. Letters Patent No. 2,819,745 of January 14, 1958. It should be noted, however, that the members 17 on the lower flights of chains 15 are the ones that engage the fruit to be moved. Also, a plurality of said members 17 may be carried on each bar 16, but the members on the bars are aligned to provide parallel rows extending longitudinally of the chains 15, The number of rows of members 17 that are used depends upon the desired capacity of the machine. Each row and the stemming rollers associated therewith operates the same hence in a machine of minimum capacity, only one row of the members 17 would be provided.

In the machine illustrated, several sets of stemming rollers are shown below the lower flights of members 17, each set comprising two horizontally spaced pairs of horizontally extending rollers, with the pairs thereof disposed in planes extending divergently upwardly from a vertical plane that bisects the space between the two pairs of each set of rollers. This arrangement provides an elongated, generally V-shaped trough (FIG. 2) along, and in which, the cherries are moved by their engagement with the members 17.

Inasmuch as the machine may have any number of sets of rollers from one up, a detailed description of one set will suffice for all.

The upper rollers of a set are designated 20 and the lower rollers 21.

The space between the lower rollers 21 is preferably substantially less than the minimum diameter of the fruit that is being stemmed, and a vertical rib 22 (FIG. 2) of relatively soft material, such as rubber or a composition, may extend upwardly in the center of the space between said lower rollers to engage the fruit such as a cherry 23 (FIG. 2) so as to just engage a cherry or the like that may be centrally positioned over the lower rollers, and the rib will, of course, tend to make the fruit topple to one side or the other against one or the other of the pairs of rollers, and also, the engagement between the cherry 23, rib 22, the rollers and the members 17 as the members 17 move the cherries longitudinally of the rib and rollers, will cause the stems 24 on the cherries to move to one side or the other where they will be engaged between the rollers. Each rib 22 may be supported in a vertically disposed position by a rod 25 recessed in any suitable manner to cross frame members 5 (FIG. 2).

While the upper rollers may be of the same diameters as the lower rollers, in the forms shown in FIGS. 1 to 6 the upper rollers have a slightly greater diameter than the lower rollers.

The upper rollers in FIGS. 1 to 4 comprise steel shafts 26 rotatably supported at their ends in bearings 27 that are on cross frame members 5 while the lower rollers 21 comprise steel shafts 28 supported in bearings 29 on cross frame members 5, said bearings 27 being movable on said cross frame members and spring urged toward the bearings 29 by springs 30, all as clearly shown and described in detail in my U.S. Letters Patent No. 2,819,745.

The portion of each shaft 26 of roller 20 that is between the supporting end bearings is formed with a plurality of radially outwardly projecting rigid ridges or ribs 31 (FIG. 4) which may be formed integrally with shaft 26 or secured thereto in any suitable manner. These ridges or ribs extend longitudinally of each shaft 26 and project equal distances outwardly thereof and are equally spaced around the shaft.

The spaces between the ridges 31 are filled with relatively soft rubber or rubber-like plastic material 32, such as neoprene or other synthetic rubber that is vulcanized or substantially integrally bonded to the ridges. The radially outwardly facing surfaces of the ridges 31 and material 32 form a continuous cylindrical surface, so as to readily slide against the outer surfaces of fruit bodies that may be thereagainst, until stemmed, without injury to such bodies.

Shafts 28 each are covered with relatively soft rubber or rubber-like material 33 of the same general characteristic as the material 32 on rollers 21, the outer surface of which is smooth and cylindrical. The material 33 may be slightly softer than that of material 32 and the springs 30 are preferably of sufficient tension to slightly flatten the engaging surfaces of the rollers of each pair when the rubber-like materials 32, 33 are in engagement with each other, but when the outer surfaces on edges of the ridges 31 engage the rollers 20 as the rollers are rotated in opposite directions, these ridges will indent themselves into the material 33 with progressively increasing force until they pass center lines extending between the axes of the rollers 20, 21 of each pair.

The upper shafts 26 of each set of rollers are connected at the feed end of the machine by universal couplings with shafts 35 (FIG. 3) that extend with gear box 36. Bevel gears 37 are respectively secured to the ends of said shafts, which gears have their teeth in mesh with bevel gears 38 that, in turn, are secured on a shaft 39. Said shaft 39 is driven by motor 7 (FIG. 1) through a sprocket chain 40 connecting sprocket wheel 41 on motor shaft 42 with sprocket wheel 43 on shaft 39.

The lower rollers 21 of each set thereof are connected by universal couplings with shafts 45 (FIG. 3) that also extend into gear box 36. The pairs of shafts 35, 45 are respectively connected by spur gears 46, 47 for rotation of the rollers of each pair at the same surface speed when shaft 39 is rotated.

The direction of rotation of shaft 39 is such that rollers 20, 21 of each pair will rotate oppositely outwardly at their adjacent sides relative to the space between the two pair of rollers, and their speed of rotation may be relatively high, or approximately 600 r.p.m. although the invention is not restricted to such speed.

If desired, the shafts 26, 27 may each have the ridges and material 32 at spaced points therealong longitudinally, and the covering 33 on shafts 28 may also be at corresponding spaced points to provide for intermediate supporting bearings on cross members 5 at points intermediate the terminating ends of said shafts, as shown and described in detail in my U.S. Letters Patent No. 2,819,745. The rollers operate in the same manner, and the use of such intermediate bearings would be desirable merely where the shafts may be so long as to make some intermediate support desirable.

The side edges of the lower portions of flexible members 17 may extend convergently downwardly, as indicated in FIG. 2, to generally conform to the inclined planes in which the pairs of stemming rollers of each set thereof are disposed, and the generally downwardly facing surfaces of the lower flights of members 17 are preferably formed with transversely extending ribs 50 that are adapted to engage the fruit to move the latter from the feed end to the discharge end of each set of rollers.

Guide strips 51 (FIG. 2) positioned at opposite sides of each set of stemming rollers, and supported above the upper rollers, are adapted to guide fruit into the space between the pairs of rollers of each set, although where the fruit is fed to the rollers at a rate of speed consistent with the capacity of the rollers to stem the fruit, these guide strips would merely serve to prevent fruit from accidentally becoming lodged between the sets of rollers. These guide strips may be carried by suitable supports 51a carried by the cross frame members 5.

In operation the cherries, grapes, olives or the like, may be fed onto the rollers of each set at the feed end of the machine from a chute 52 (FIG. 1). Upon being deposited between the two pairs of rollers of each set thereof, the fruit bodies will engage the lower rollers 21, which will position them for rotation with their stones projecting laterally, since the stems tend to obstruct end over end rotation, unless the fruit is restricted so as to compel such rotation. In the present instance there is no such restriction.

As soon as the stems project laterally they are caught between the rollers of one pair or the other according to the side to which the stems project, and once the stems are engaged between rollers 20, 21 the stems will rapidly be drawn through the rollers and the fruit will be brought against the outer cylindrical surfaces of said rollers.

The fruit is rolled along the rollers by the members 17. A sprocket wheel 53 on shaft 13 at the feed end of the machine connects by a chain 54 with a sprocket wheel on shaft 39 for driving the members 17.

Referring to FIG. 4 the stem 24 has been engaged between rollers 20, 21 and it is frictionally grasped between the material 34 on roller 20 and material 30 on roller 21. In this position, were the material 32 on roller 20 to extend completely around the roller, in the same manner as the material 33 extends around roller 21, the stem may or may not be pulled from the fruit body 23, according to how tightly the stem is connected with the body. Hence the stem may be pulled from the fruit before a rib or ridge 31 engages it.

Normally the rollers are wet, and where olives are being stemmed, they may be coated with oil. In such instances if the stem is not immediately pulled from the fruit, there may be a slight slippage between the fruit body and the rollers where the body is in engagement with the rollers due to the slippage of the rollers on the stem. If the slippage of the rollers against the fruit body is not prolonged to any great degree, no damage will be done to the fruit because the outer surfaces of the rollers are cylindrical and smooth.

However, a prolonged slippage of the rollers against the fruit body would injure the fruit. Such prolonged slippage is prevented by the action of the ridge 31 which, as it rotates into engagement with one side of the stem, will not only cause a gripping pressure on the stem appreciably greater than that applied by the materials 32, 33, but the stem will be slightly bent or kinked, as at 55 (FIG. 5) so as to materially increase the resistance to slippage of the ridge 31 along the stem. In fact, such latter slippage is virtually impossible. Another effect of the progressive, but nevertheless sudden, stoppage of slippage between the rollers and the stem is to give the stem a jerk. The increased pull on the stem and the jerk thereon invariably is sufficient to remove the stem from the fruit. As seen in FIG. 5 the stem 24, when pulled, is substantially coaxial with the pit and fruit, hence the stem is not broken by the pull.

The time interval between any slippage of the rollers on the stem and the application of the added pull that separates the stem from the pit or fruit, is hardly measurable when it is considered that the rollers may be rotating approximately 600 r.p.m. If only a single ridge 34 were used, as in FIG. 6, and such ridge were required to make a complete revolution during the slippage of the rollers on the stem, the time required for it to engage the stem would not be apparent.

The upper roller 57 (FIG. 7) may have a substantially continuous peripheral row of ridges or teeth 58 between which relatively soft, resilient, rubber or rubber-like material 59 is inseparably bonded to the teeth. The outer edges of these ridges are not sharp enough to cut the stem 24, but several may grip the stem, as seen in FIG. 7. The outer surface of the roller is cylindrical and smooth.

In FIG. 7, as has already been mentioned, a single ridge 54 may be used, with the rest of the cylinder as at 60, being relatively soft, resilient material such as at 32 in FIG. 4.

Referring to FIG. 8, instead of each set of rollers comprising two pairs, as in FIG. 2, each set may comprise a single pair of horizontal rollers 60 supported in engagement with each other in a horizontal plane in bearings 62 and side guide members 63, 64 retain the fruit on each pair of rollers for movement of the fruit from one of the ends of the rollers to the other by members 65 mounted on rods and chains exactly as shown in FIGS. 1 and 2. Rollers 60 of each set are rotated oppositely for drawing stems downwardly between them, and each roller is substantially the same structurally as each of the upper rollers in FIGS. 2 and 4, each having ridges 66 that are positioned so that the ridge 66 on one roller will seat in the resilient material 67 on the other roller as the rollers are rotated.

The mounting of these rollers is similar to that of the rollers of each pair in FIG. 2, except that the rollers are not in inclined planes. In my copending application Serial No. 17,280 filed March 24, 1960, the structure is shown in detail.

It is to be understood that this same arrangement of rollers can be used for each pair of rollers in FIGS. 1 and 2 instead of the structure there illustrated.

While the invention has been described with respect to definite structure, it is to be understood that this structure is not intended to be restrictive of the invention. Various modifications may be made in the structure that is illustrated and yet accomplish the same method steps.

As mentioned, the roller structure generally shown in FIG. 8 may be used in FIG. 2, and the roller sizes shown in FIG. 2 and FIGS. 4 to 7 may vary.

Insofar as the method is concerned, it is seen that in all of the views, the opposite sides of each item is engaged between substantially opposed gripping surfaces, and these surfaces are continuously moving in a direction away from the body under progressively increasing gripping pressure gainst opposite sides of the stem, to and past a point of maximum pressure.

As seen in FIGS. 4, 5, for example, the pressure against opposite sides of the stem in FIG. 4 is substantially uniform, until one of the ridges 31 approaches the roller 21 and then the pressure against the stem suddenly increases until the point of maximum pressure occurs at the point shown in FIG. 5, and then, at this point, the stem is bent transversely thereof, as indicated in FIG. 5, and thus occurs to some degree in all instances, and the fruit body is held stationary against the rollers while the stem is pulled therefrom.

Some stems may be pulled from the fruit before the relative positions shown in FIG. 5 or 6 occurs, and this bending of the stem may be relatively slight, but the resistance to slippage of the stem relative to the gripping surfaces is so great as to pull the most obstinate stems from the fruit bodies or pits, without injury to the fruit.

I claim:

1. In a fruit stemming machine for stemming fruit bodies such as cherries, olives, grapes and the like that have stems projecting therefrom:
   (a) a pair of horizontally extending rollers in side by side relation;
   (b) each roller of said pair having a continuous relatively smooth, cylindrical outer surface substantially from end to end thereof;
   (c) a section of one roller of said pair extending longitudinally of said one roller being of relatively rigid material and having a narrow portion of said outer surface thereon;
   (d) portions of said one roller adjoining opposite sides of said section and said narrow portion being of relatively soft, resilient material yieldable inwardly toward the axis of said one roller upon application of pressure against the outer cylindrical surfaces thereof;
   (e) the other roller of said pair including a resilient portion of relatively soft material of substantially greater width circumferentially of said other roller than the width of said outer surface of said section;
   (f) said last mentioned resilient portion having a portion of the outer cylindrical surface of said roller thereon;
   (g) means supporting said rollers for rotation in opposite directions with their outer surfaces in engagement with each other and with said outer surface of said rigid section adapted to engage the outer surface of said resilient portion on said other roller upon each revolution of said rollers whereby a projecting stem between said rollers and on a body that is against the outer surface of said rollers that are moving toward each other will be forced into said resilient portion of said other roller by said section and quickly plucked from said body upon said outer surface of said section engaging said stem;
(h) means connected with said rollers for so rotating them in said opposite directions.

2. In a construction as defined in claim 1, said last mentioned means driving said rollers at the same surface speed, and said means supporting said rollers being bearings holding said rollers together under sufficient pressure for forcing said section into said resilient portion of said other roller during engagement between said section and said resilient portion while said rollers are rotated.

3. In a fruit stemming machine for stemming fruit bodies such as cherries, olives, grapes and the like that have stems projecting therefrom:
   (a) a pair of horizontally extending rollers in side by side relation;
   (b) each roller of said pair including an outer layer of relatively soft, resilient material adapted to yield inwardly under pressure of said stems and a rigid object thereagainst:
   (c) one roller of said pair having a rigid ridge extending longitudinally thereof within and bonded to said layer and extending to the outer surface of said one roller and the outer surfaces of both of said rollers being continuously cylindrical substantially from end to end of said rollers;
   (d) means supporting said rollers for rotations in opposite directions with their outer surfaces in engagement with each other whereby the stem of one of such fruit bodies drawn between the outer surface of said ridge and the outer surface of the resilient layer on the other roller of said pair and extending transversely across said ridge and projecting to opposite sides thereof will be bent over said ridge by the layer on said other roller and substantially imbedded in said last mentioned layer where such stem extends across said ridge;
   (e) the width of said ridge at its said outer surface being substantially less than the length of stems on said bodies.

4. In a fruit stemming machine for stemming fruit bodies such as cherries, olives, grapes, and the like that have stems projecting therefrom:
   (a) a pair of horizontally extending rollers in side by side relation the outer surface of each roller being continuously cylindrical substantially from end to end thereof;
   (b) one roller of said pair having an outer layer of relatively soft, resilient material;
   (c) the other roller of said pair having a plurality of rigid, relatively narrow sections extending longitudinally thereof and spaced around said rollers, the radially outwardly facing surfaces of said sections defining sections of the outer surface of said other roller;
   (d) relatively soft, resilient material between and connected with said sections;
   (e) the radially outwardly facing surfaces of said material and the outer surfaces of said sections defining a cylindrical surface;
   (f) means supporting said rollers for rotation in opposite directions and in positions in which said outer surfaces of said sections will successively engage the outer surface of said outer resilient layer on said one roller and will depress a stem into said outer layer on said one roller upon such stem being drawn between said pair of rollers.

5. In a fruit stemming machine for stemming fruit bodies such as cherries, olives, grapes and the like that have stems projecting therefrom:
   (a) a pair of horizontally extending cylindrical rollers in side by side relation rotatable about parallel axes;
   (b) the outer cylindrical surfaces of said rollers being smooth and continuously cylindrical for slipping against such bodies when the latter are drawn into engagement therewith without causing injury to said bodies;
   (c) alternate relatively soft, resilient and rigid sections on one roller extending longitudinally thereof on which its cylindrical outer surface is formed;
   (d) the outer surface of the other roller of said pair having relatively soft, resilient sections on which its said cylindrical surface is formed adapted to engage said rigid sections on said one roller when said rollers are rotated simultaneously in opposite directions and are in engagement with each other;
   (e) means connected with said rollers for so rotating them at the same surface speed;
   (f) means supporting said rollers in engagement with each other and with said sections on said rollers in positions in which said rigid sections on said one roller will engage said resilient sections on said other roller during each revolution of said rollers;
   (g) the outer surface of the resilient section of said other roller extending a substantial distance to opposite sides of each rigid section on said one roller along the line of meeting between each rigid section on said one roller and the resilient section of the other roller.

6. In a construction as defined in claim 5; and
   (h) means for supporting said bodies in positions for engagement of the stems on said bodies with the surfaces of said rollers that are rotated in directions away from said bodies whereby said stems when so engaged between said rollers will be pulled against the latter and said stems pulled therefrom;
   (i) said widths of said rigid sections at the cylindrical outer surface of said one roller being less than the lengths of the stems on such bodies;
   (j) said means supporting said rollers in engagement with each other being in positions forcing said rigid sections into said resilient sections on said other roller, along said line of meeting.

7. In a construction as defined in claim 5;
   (h) rigid sections on said other roller spaced therearound and extending longitudinally thereof, extending to the outer cylindrical surface of said other roller.

8. In a fruit stemmer for stemming bodies of fruit such as cherries, olives, grapes and the like:
   (a) two pairs of elongated horizontally extending rollers with the rollers in each pair in side by side relation;
   (b) said pairs of rollers being parallel and in horizontally spaced side by side relation at opposite sides of a vertical plane bisecting the space between said two pairs;
   (c) the axes of the rollers of said pairs at said opposite sides of said plane being in planes extending divergently upwardly from said vertical plane whereby one of the rollers in each pair will be a lower roller and the other roller in each pair will be an upper roller, and whereby said pairs of rollers will form the sides of a generally V-shaped channel for receiving said bodies of fruit therebetween;
   (d) the space between the lower rollers of said pairs being substantially less than the diameters of the bodies of fruit to be stemmed;
   (e) the rollers of said two pairs having relatively smooth continuously cylindrical outer surfaces;
   (f) a section of one roller of each pair extending longitudinally thereof being of relatively rigid material and having a narrow portion of said outer surface thereon and;
   (g) portions of said one roller of each pair adjoining opposite sides of said section and said narrow portion being of relatively soft resilient material yieldable inwardly toward the axis of said one roller upon application of pressure against the outer cylindrical surfaces thereof;

(h) the other roller of each pair including a resilient portion of relatively soft material of substantially greater width circumferentially of said other roller than the width of said narrow surface on each of said one rollers;

(i) means supporting said rollers of each pair for rotation in opposite directions with the adjacent surfaces of said lower rollers moving upwardly and with the outer cylindrical surfaces thereof in engagement with each other and with said outer surfaces of said sections adapted to engage the resilient portion of said other rollers upon each revolution of the rollers of each pair;

(j) means connected with said pairs of rollers for rotating the rollers of said pairs simultaneously with said rollers in each pair rotating in said opposite directions whereby the stems on said fruit bodies between said pairs of rollers will be engaged between the rollers at one side or the other and drawn from said bodies.

9. In a fruit stemming machine for stemming fruit bodies such as cherries, olives, grapes and the like that have stems projecting therefrom;

(a) a pair of horizontally extending parallel rollers in side by side relation;

(b) means operatively connected with said rollers for rotating them in a direction for movement of their adjacent surfaces in the same direction;

(c) said rollers having circumferentially spaced, radially extending relatively rigid ribs formed thereon;

(d) said rollers being positioned relative to each other for alternate movement of said ribs past the closest point between the rollers of said pair during said movement of their adjacent surfaces;

(e) each of said rollers including an outer layer of resilient material secured thereto in the spaces between the adjacent pairs of said ribs adapted to be engaged and compressed by said ribs upon said rotation of said rollers whereby the stems on fruit bodies adapted to be drawn between said pair of rollers from one of their sides will be tightly gripped between one of said ribs on one of said rollers and the resilient material on the other roller;

(f) means supporting said rollers in tight engagement with each other for said compression of said resilient material by said ribs;

(g) the radially onwardly facing surfaces of the layers of resilient material between said adjacent pairs of said ribs being continuously smooth and cylindrical and the radially outwardly facing surfaces of said ribs terminating flush with and in cylindrical continuation of the radially outwardly facing surfaces of said layers.

References Cited in the file of this patent

UNITED STATES PATENTS

| | | |
|---|---|---|
| 1,071,925 | Keith | Sept. 2, 1913 |
| 1,835,190 | Stansbury | Dec. 8, 1931 |
| 1,924,111 | Erickson | Aug. 29, 1933 |
| 2,178,013 | Blank | Oct. 31, 1939 |
| 2,508,728 | Stansbury | May 23, 1950 |
| 2,527,182 | Gaddie | Oct. 24, 1950 |
| 2,535,485 | Cover | Dec. 26, 1950 |